(12) United States Patent
Johe

(10) Patent No.: US 6,341,815 B1
(45) Date of Patent: Jan. 29, 2002

(54) INSIDE CEILING FOR A VEHICLE LAMELLA ROOF SYSTEM

(75) Inventor: Ralf Johe, Bietigheim-Bissingen (DE)

(73) Assignee: CTS Fahrzeug Dachsysteme GmbH, Korntal-Münchingen (DE)

( * ) Notice: Subject to any disclaimer, the term of this patent is extended or adjusted under 35 U.S.C. 154(b) by 0 days.

(21) Appl. No.: 09/609,767

(22) Filed: Jul. 3, 2000

(30) Foreign Application Priority Data

Jul. 3, 1999 (DE) .......................... 199 30 776

(51) Int. Cl.[7] .......................... B30R 13/02; B60J 7/047
(52) U.S. Cl. .................... 296/214; 296/220.01
(58) Field of Search ............. 296/214, 220.01; 49/414, 421

(56) References Cited

U.S. PATENT DOCUMENTS 5,335,961 A * 8/1994 Reinsch et al. ............. 296/213
6,000,749 A * 12/1999 Adam et al. ................. 296/214
6,053,568 A * 4/2000 Jambor ....................... 296/213

FOREIGN PATENT DOCUMENTS

DE  197 20 000  7/1998

* cited by examiner

Primary Examiner—Dennis H. Pedder
(74) Attorney, Agent, or Firm—Crowell & Moring LLP

(57) ABSTRACT

A vehicle segmental roof has at least two adjacent segments which are arranged in a roof opening for adjustment between a closed position and an open position. A foldable inside roof lining is arranged on the underside, facing the vehicle interior, of the segments and is acted upon with force by a tensioning element. To form a simple tensioning element, the tensioning element is fastened on the underside of a segment, on that side of the inside roof lining which faces away from the vehicle interior. The tensioning element has a tensioning clip which, in the open position of the segments, acts upon the inside roof lining.

10 Claims, 2 Drawing Sheets

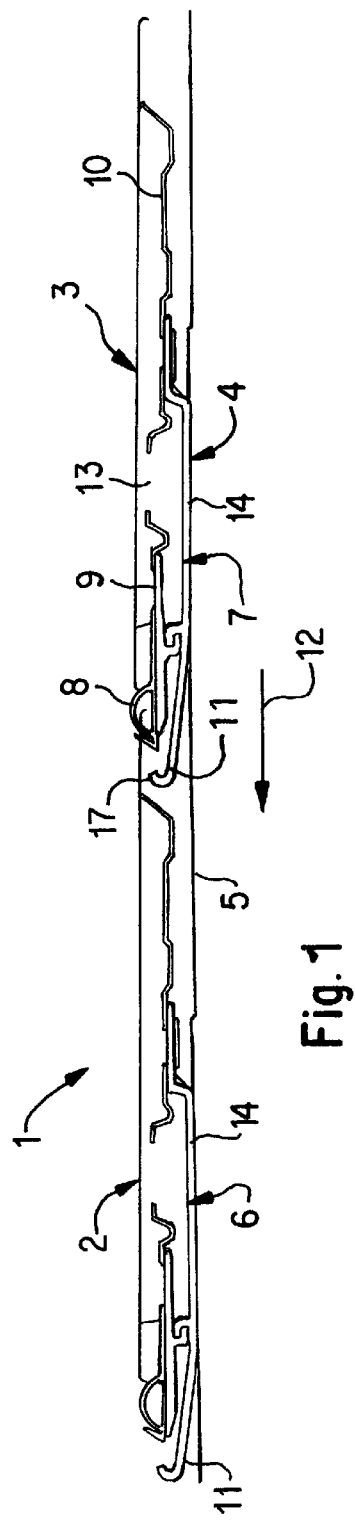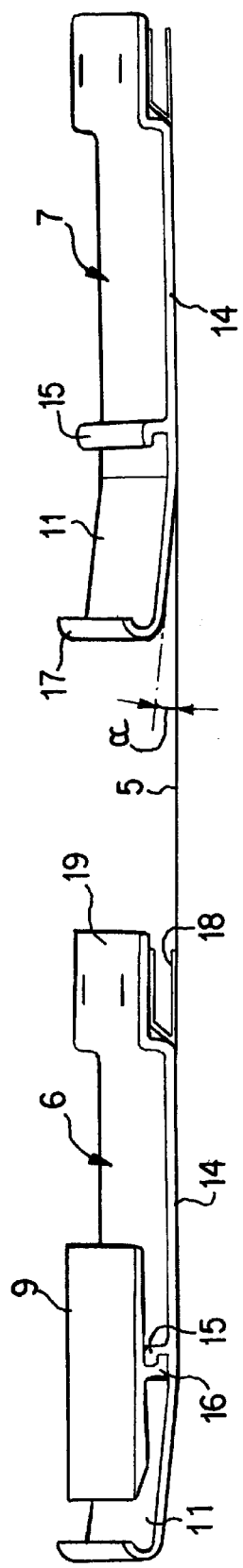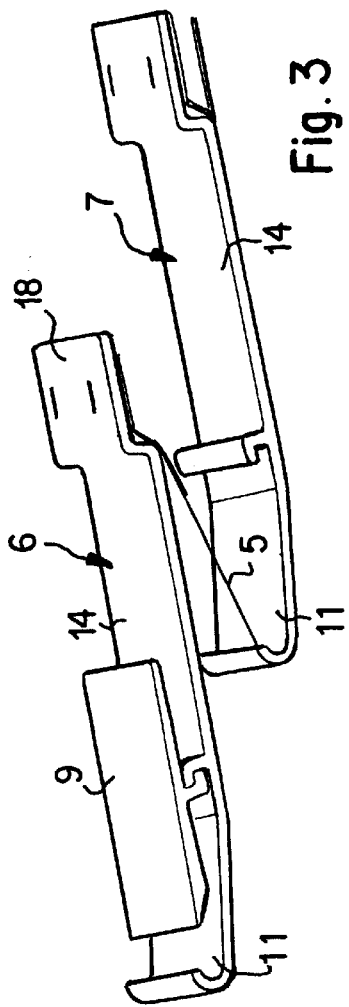

INSIDE CEILING FOR A VEHICLE LAMELLA ROOF SYSTEM

BACKGROUND OF THE INVENTION

The present invention relates to an inside roof lining for a vehicle segmental roof, which lining is arranged on the underside facing the vehicle interior, of a vehicle segmented roof having at least two adjacent segments which are moveable in a roof opening between a closed position and an open position, and which is acted upon with force by a tensioning element.

DE 197 20 000 Cl discloses a sliding roof for a motor vehicle consisting of a plurality of segments. The segments are arranged one behind another in the longitudinal direction of the vehicle, and are displaceable and can be hooked out obliquely. On the underside, facing the vehicle interior, the segments have a foldable inside roof lining which is placed under tension in the closed position of the vehicle roof, but in the open position of the vehicle roof, with the segments moved out obliquely, is folded up because the pivot axes of the segments have moved closer together.

According to DE 197 20 000 Cl, the inside roof lining is a rolling screen which can be rolled up and is acted upon with a tensioning force via a spring-loaded roller. In the open position of the roof, the inside roof lining is wound onto the roller, as a result of which the formation of folds is prevented and a permanent tensioning of the fabric is ensured.

The inside roof lining as a rolling screen which can be wound up requires a spring-loaded roller which requires additional installation space and also has to be maintained in order to ensure the operativeness even over long periods. Moreover, when a roller is used, the choice of type of fabric for the inside roof lining is restricted, since the winding onto the roller is possible only with comparatively thin-walled types of fabric, whereas thicker and/or softer fabrics are preferred for visual and aesthetic reasons and also for strength reasons.

If, on the other hand, a tensioning element loading the inside roof lining is omitted, there is the risk that when the segmental roof is opened, the inside roof lining comes into contact, through the gaps between adjacent segments, with the painted outer surface of the segments, which may result in the paint being scratched because of the relative movement of the fabric. Moreover, at relatively high speeds annoying flapping noises may be produced.

SUMMARY OF THE INVENTION

The present invention is addressed to the problem of placing the inside roof lining of a vehicle segmental roof under tension in the open position in a simple manner.

According to the present invention, this problem has been solved by providing that the tensioning element is fastened on the underside of the segment, on that side of the inside roof lining which faces away from the vehicle interior, the tensioning element has a tensioning clip which, in the open position of the segment, acts upon the inside roof lining.

According to the present invention, the tensioning element is fastened on the underside of a segment, between the segment and inside roof lining, so that essentially no additional installation space is needed for the tensioning element. The tensioning element has a tensioning clip which, at least in the open position of the segments, acts upon the inside roof lining and ensures the tensioning of the inside roof lining. The tensioning clip is implemented as a simple, mechanical component which executes just a slight relative movement, if any at all, with respect to the associated segment during the transfer from the closed position into the open position. As a result, no complicated and error-prone kinematics are required for producing the tensioning of the fabric. The entire tensioning element including the tensioning clip can be a single-piece component which is constructed homogeneously and consists of only one material, thereby simplifying the production and assembly.

In an expedient embodiment, the tensioning clip grips under an end side, as seen in the longitudinal direction of the vehicle, of that segment to which the tensioning clip is fastened. This has the advantage that the tensioning clip can, in addition to its tensioning function, be used as a gutter by the free end section of the tensioning clip advantageously being bent upward. Consequently, in the open position, water penetrating into the gap between adjacent segments is collected by the tensioning clip and conducted away to the side of the roof.

That section of the tensioning clip which expediently protrudes over the segment in the longitudinal direction also has the advantage that the reduction, obtained in the closed position, in the distance between adjacent segments can be compensated for via the tensioning clip. As a result, the web of the fabric roof lining between adjacent segments can be sized such that it is at least the same length in the open position as in the closed position. This ensures that the inside roof lining is tensioned in the open position of the roof, as a result of which flapping of the fabric is reliably avoided and there is also no risk of the inside roof lining coming into contact with the scratch-prone, painted outer surface of the segments. In a currently preferred design, the fabric web is slightly stretched in the open position to achieve a taut tensioning of the fabric. The extension of the fabric web can be achieved in a simple manner by a correspondingly extended implementation of the tensioning clip. This design is particularly suitable for stretchable, elastic types of fabric which contract again to the original size when the vehicle roof is closed, in order to ensure that the fabric is also sufficiently tensioned in the closed position and the inside roof lining bears smoothly against the underside of the segments.

The tensioning clip advantageously encloses an angle, which in particular is not greater than 10°, with the plane of the inside roof lining in the closed position of the segmental roof. This ensures that in the open position, the angular position of the segments is at least partially compensated for by the angular section of the tensioning element, so that this section of the tensioning element runs approximately horizontally. This has the advantage that, when the tensioning clip is used as a gutter, the free end section of the tensioning clip remains comparatively far upward, whereby even relatively large amounts of water can be contained without the risk of overflowing.

The tensioning clip is preferably elastic, so that during the transfer from the closed position into the open position, during which the inside roof lining comes into contact with the tensioning clip, a continuously increasing tensioning force is built up in the inside roof lining. As a result, suddenly occurring concentrations of tension can be avoided.

BRIEF DESCRIPTION OF THE DRAWINGS

Other objects, advantages and novel features of the present invention will become apparent from the following detailed description of the invention when considered in conjunction with the accompanying drawings wherein:

FIG. 1 is a sectional view through a combined structure of two segments, arranged one behind the other, of a segmental vehicle roof according to the present invention, FIG. 2 is a perspective view of two tensioning elements in the closed position, the elements being assigned to segments arranged one behind the other, with an inside roof lining situated in between, FIG. 3 is a perspective view of the tensioning elements in the open position.

DETAILED DESCRIPTION OF THE DRAWINGS

Figure 4:
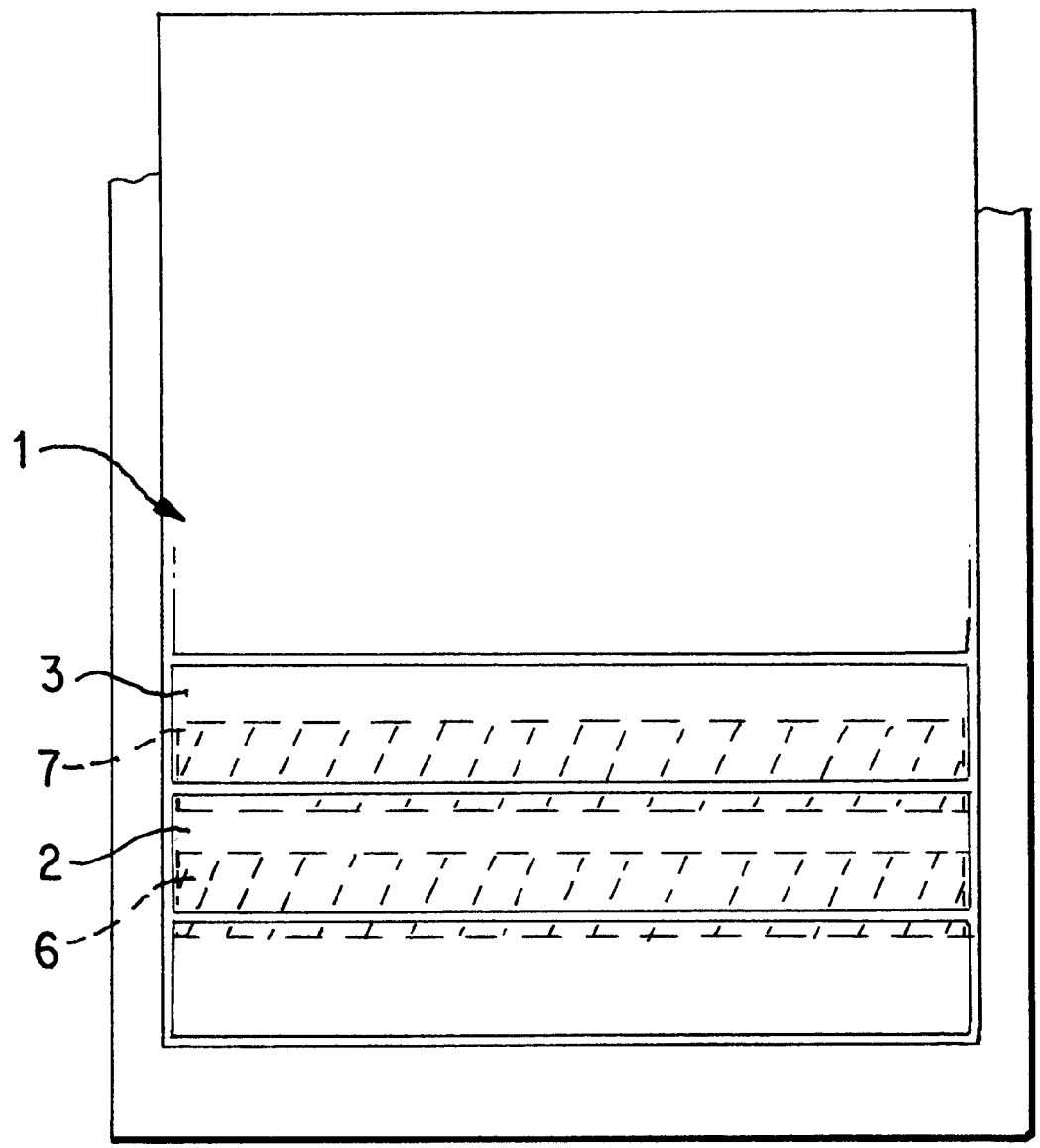
FIG. 4 is a top view of the roof where the tensioning elements of FIG. 1 are shown extending over the width of the roof opening and the length of the segments.

In the embodiments illustrated in FIGS. 1 to 3, identical components are provided with the same reference numbers.

In FIG. 1, two roof segments 2, are arranged one behind the other in the longitudinal direction of the vehicle and are adjustable in a roof opening of a vehicle roof between the illustrated closed position and an open position, in which the vehicle interior is opened upward. The segmental roof has at least two segments, more than two segments generally being provided. The segments 2, 3 can be adjusted in a translatory manner in and/or counter to the longitudinal direction of the vehicle. In addition to the translatory displacement movement, each segment 2 or 3 can execute a rotary upright-positioning movement about a transverse axis orthogonally to the longitudinal direction 12 of the vehicle. In the moved-out position of the segments 2, 3, the distance between adjacent segments 2, 3, as measured in the longitudinal direction 12 of the vehicle, is generally reduced.

Each segment consists of a segment body 13 into which an internal plate 10 is placed for stabilization purposes. In the region of an end side pointing in the longitudinal direction of the vehicle, a segment seal 8 is arranged on each segment, via which seal a water-tight closure between two adjacent segments bordering one another can be produced in the closed position. The segment seal 8 is held on a seal carrier 9 which is fastened captively to the segment body 13.

On the underside 4, facing the vehicle interior, of the respective segments 2, 3 a tensioning element 6, 7 is assigned to a segment and 6 connected fixedly to the associated segment. There is furthermore mounted on the underside 4 a foldable inside roof lining 5 which extends at least between two adjacent segments, but expediently completely covers the underside of all of the segments of the vehicle roof, and is in particular manufactured from one piece. The tensioning elements 6, 7 are also at least partially covered over by the inside roof lining 5.

Each tensioning element 6, 7 consists of a central fastening section 14 and of a tensioning clip 11 which is integral with the fastening section 14 and points in the direction of the front side of the vehicle. The central fastening section 14 bears directly and in a planar manner on the underside of the associated segment and has an upwardly directed projection 15 which is provided with a latching lug which in the installation position snaps into a complementarily shaped latching opening in a projection 16, which is formed on the seal carrier 9. This creates, in the vertical direction, a positive connection between the seal carrier 9 of a segment and the respective tensioning element 6, 7.

The tensioning clip 11 forms an end section of the tensioning element 6 or 7. It has an end section 17 which is bent upward, is in the form of part of a circle and is curved convexly toward the central fastening section 14 of the tensioning element.

The tensioning clip 11 consists of an inherently flat section which encloses, with the fastening section 14, an angle a which expediently amounts to a maximum of 10°. The tensioning clip 11 is bent upward in the opposite direction to the vehicle interior. Since the central fastening section 14 of the tensioning element is situated in the fabric plane of the inside roof lining 5, the tensioning clip 11 also encloses the angle a with the inside roof lining 5 in the closed position of the roof.

The tensioning clip 11 grips under the segment seal 8 in the vertical direction and at the same time protrudes over the end side of the segment in the longitudinal direction 12 of the vehicle. In conjunction with the bent-up end section 17, a gutter is thereby produced which, in particular in the open position of the roof, collects the water flowing off the segments positioned in the upright state and, provided that the tensioning elements extend over the entire width of the roof and length of the segments, can conduct it away to the side region of the roof. On account of the angled arrangement of the tensioning clip 11, when the segments are moved out, the tensioning clip 11 lies approximately in a horizontal plane. It may, if appropriate, be expedient to match the angle α to the upright-positioning angle of the segments, so that the tensioning clip 11 assumes a horizontal position in the open position of the vehicle roof, cf. also FIG. 3. In this case, it may be expedient to form the angle α such that it is greater than 10°.

As can be seen from FIG. 2, the inside roof lining 5 spans the distance between the tensioning elements 6 and 7 of adjacent segments and is connected fixedly to each tensioning element in particular via a fastening element 18, which is arranged in the region of an end shoulder 19 of the tensioning element. The end shoulder 19 is arranged on that side of the central fastening section 14 of the tensioning element which faces away from the front side of the vehicle.

As can be seen in FIG. 3, in the moved-out position of the segments, with the tensioning elements 6, 7 correspondingly moved out, the fabric of the inside roof lining 5 bears in a planar manner on the underside, facing the vehicle interior, of each tensioning clip 11. The inside roof lining is tensioned in the open position, so that even the free section of the inside roof lining, which section extends between two tensioning elements 6 and 7, forms an inherently planar, fold-free surface which is under tension. Since, in the open position, the rear end section 18 of a tensioning element protrudes over the front tensioning clip 11 of the following tensioning element in the direction of the vehicle, the inside roof lining 5 runs in a zigzag shape, that section of the inside roof lining 5 which is situated between two tensioning elements 6 and 7 facing the opposite direction to the sections of the inside roof lining which are connected fixedly to the underside of the tensioning elements. That section of adjacent tensioning elements which is overlapped in the open position of the segments is preferably selected in such a manner that the inside roof lining 5 is under tension in the open position. The tension can be set via the length of the tensioning clip 11, in particular, so that during the transfer from the closed position into the open position, the inside roof lining 5 undergoes stretching which can lie, for example, in the region of a millimeter. On account of the elasticity of the fabric of the inside roof lining, the inside roof lining returns back into shape during the transfer from the open position into the closed position.

In a first expedient design, the tensioning clip 11 is of rigid design and connected fixedly to the central fastening section 14 of the tensioning element. In this design, the tensioning of the inside roof lining 5 is produced exclusively by the relative movement between two adjacent segments.

However, it may also be advantageous to make the tensioning clip deformable elastically in order to achieve a continuously increasing tension in the inside roof lining 5 during the transfer into the open position. Such tensioning elements 6 are advantageously manufactured from metal.

It may be advantageous not to provide a tensioning element on the first segment situated closest to the front side of the vehicle and only to fit the segments following the first segment with tensioning elements.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A foldable inside roof lining of a vehicle segmental roof arranged on an underside of the roof to face a vehicle interior, the roof having at least two adjacent segments, moveable in a roof opening operation between a closed position and an open position, and which is force actuated by at least one tensioning element, wherein the at least one tensioning element is fastened on the underside of a respective one of the segments, on a side of the inside roof lining facing away from the vehicle interior, the at least one tensioning element having a tensioning clip which, in the open position of the associated segment, is configured to tension the inside roof lining and to maintain the lining wrinkle-free.

2. The inside roof lining as claimed in claim 1, wherein the tensioning element affects stretching of the lining, between two adjacent segments during transfer from the closed position into the open position.

3. The inside roof lining as claimed in claim 1, wherein the lining is tensioned in the open and closed positions of the segments.

4. The inside roof lining as claimed in claim 1, wherein the tensioning element extends over the width of the roof opening and of the segment.

5. The inside roof lining as claimed in claim 1, wherein the tensioning clip is configured with a free end section bent upward in a direction of the segment.

6. The inside roof lining as claimed in claim 1, wherein the tensioning clip is configured to grip at an end side of the segment, as seen in a longitudinal direction of the vehicle.

7. The inside roof lining as claimed in claim 1, wherein the tensioning clip has a flat section which encloses an angle with a plane of the inside roof lining in the closed position of the segmental roof.

8. The inside roof lining as claimed in claim 7, wherein the angle is a maximum of 10°.

9. The inside roof lining as claimed in claims 1, wherein the tensioning clip is configured to be elastic.

10. The inside roof lining as claimed in claim 1, wherein each of the segments is associated with a respective tensioning element.

* * * * *